Patented Jan. 23, 1923.

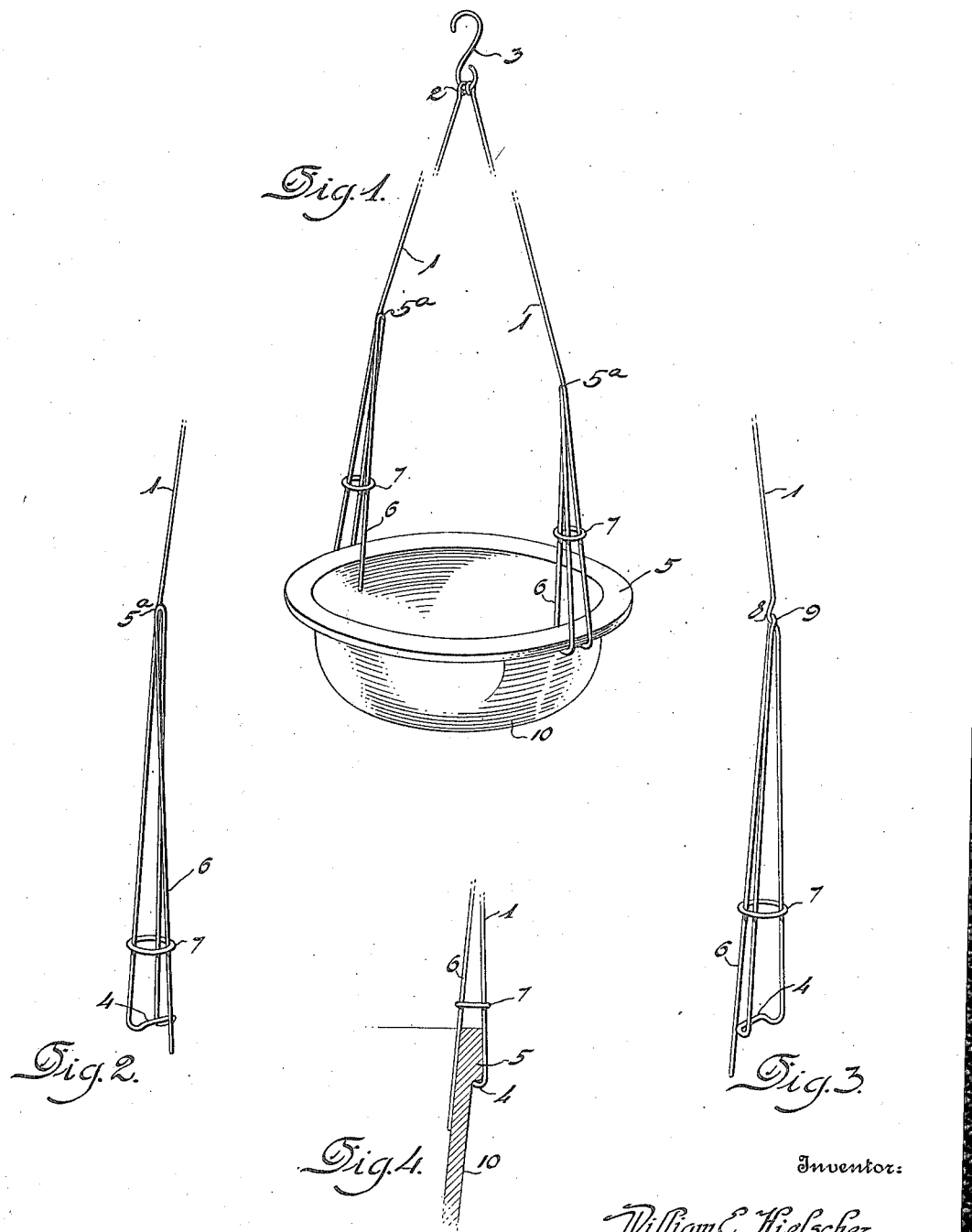

1,443,022

UNITED STATES PATENT OFFICE.

WILLIAM E. HIELSCHER, OF DETROIT, MICHIGAN.

POTHANGER.

Application filed March 10, 1922. Serial No. 542,662.

*To all whom it may concern:*

Be it known that I, WILLIAM E. HIELSCHER, a citizen of the United States of America, residing at Detroit, in the county of Wayne and State of Michigan, have invented certain new and useful Improvements in Pothangers, of which the following is a specification, reference being had therein to the accompanying drawings.

This invention relates to a pot hanging device, and has special reference to a wire structure that may be attached to a flower pot, basket or other receptacle for suspending the same from a suitable support, such devices being used in connection with receptacles containing growing vines and the like.

The primary object of my invention is to provide a simple, durable and inexpensive wire hanger made of practically two pieces of wire which may be easily and quickly bent or fastened to afford pot gripping members by which the pot may be safely suspended from a suitable support.

A further object of my invention is to provide a pot hanger embodying suspension members having inner and outer pot engaging portions which are clamped in engagement with the rim, edge or side walls of the pot and such suspension members do not necessitate any change in a pot construction, interfere with growing plants therein, nor detract from the general appearance of the flower pot or receptacle.

The above and other objects are attained by a mechanical construction that will be hereinafter specifically described and then claimed, and reference will be had to the drawing wherein—

Figure 1 is a perspective view of the pot hanging device partly broken away, showing a pot or receptacle supported by the device;

Fig. 2 is a perspective view of a portion of one of the suspension members of the device;

Fig. 3 is a similar view illustrating a modified form of suspension member, and

Fig. 4 is a side elevation of a portion of a suspension member as applied to a wall of an ordinary flower pot.

The pot hanging device comprises two opposed suspension members 1 each made of a circular piece of wire or other light and durable material preferably galvanized or otherwise treated so as to be practically rust proof. The upper end of each member terminates in an eye or hook 2 so that said members may be held by a double hook 3 or other device by which the members may be suspended from a suitable support.

The piece of wire forming each member is bent intermediate its ends to provide angular portions so that the suspension members will provide clearance for any growing plants within a pot or other receptacle to which the suspension members are connected.

The lower end of each suspension member is bent to provide a laterally projecting portion 4 adapted to engage under the edge, rim or flange 5 of a pot or receptacle 10. As shown in Fig. 1, the pot or receptacle may be somewhat in the form of a bowl or basket and in Fig. 4, there is shown a wall of an ordinary ceramic or crock.

After forming the lateral portion 4 of the suspension member the end of the piece of wire is bent on itself to the extent of joining the suspension member at the juncture of the angular portions thereof, such juncture being indicated $5^a$, where the adjoining pieces of wire are brazed, spot welded, soldered or otherwise connected together, so that the lower end of the suspension member terminates in somewhat of a triangular shaped arm having for its base the lateral portion 4. After effecting this structure the extremity of the wire is again bent into a return portion or arm 6 that extends downwardly past or in proximity to the lateral portion 4, so that the lower end of the suspension member results in a bifurcation or inner and outer arm that may be sprung to and from each other.

As mentioned before the lateral portion 4 is adapted to engage under the edge, rim or flange 5 of the pot and consequently the triangular shaped arm is at the outer wall of the pot. With the outer arm in this position the inner return arm 6 extends down into the pot against the inner wall thereof and said arms may be frictionally clamped in engagement with the pot wall. This is accomplished by a ring or annular member 7 slidable on said arms and said ring or member may be lowered to force the arms towards each other and thus clamp the arms in engagement with the pot wall, as best shown in Fig. 4. The weight of the pot and its contents is supported from the lateral portions 4 of the outer arms and there is practically no tendency of the pot to cause separation of the arms. The inner arms simply retain the outer arms under the rim, edge or flange of the pot and there is no danger of the ring or member 7 being forced upwardly on the suspension member.

In Fig. 3 there is illustrated a slight modification of my invention wherein the brazing, spot welding or soldering of the inner and outer arms is obviated by simply providing the outer arm with an indented or kinked portion 8 in which may engage a looped portion 9 at the upper end of the inner return arm 6. In either instance the inner and outer arms can be sprung to and from each other so that said arms may be easily placed in engagement with the edges of a pot, basket or other receptacle that is to be suspended from a suitable support.

While in the drawings there are illustrated the preferred embodiments of my invention, it is to be understood that the structural elements are susceptible to such variations and modifications as fall within the scope of the appended claims.

What I claim is:—

1. A pot hanger comprising suspension members each made from a single piece of wire having its lower end bent to form a triangular shaped arm having for its base a lateral pot rim engaging portion, and a return portion diverging from the apex of the triangular shaped arm and adapted to engage the inner wall of the pot, said return portion being permanently connected to the piece of wire at the apex of the triangular shaped arm.

2. A pot hanger made of two pieces of wire having the upper ends thereof connected and each piece of wire having its lower end bent on itself to form a triangular shaped arm having for its base a lateral pot rim engaging portion, each piece of wire having a return portion diverging from the apex of the triangular shaped arm so that the lateral pot rim engaging portion and the return portion may engage inner and outer pot walls, and a ring slidable on the triangular shaped arm of each piece of wire adapted to be lowered to clamp the piece of wire in engagement with the pot.

In testimony whereof I affix my signature in presence of two witnesses.

WILLIAM E. HIELSCHER.

Witnesses:
G. E. McGRANN,
K. H. BUTLER.